United States Patent [19]

Speier et al.

[11] 3,899,515

[45] *Aug. 12, 1975

[54] METHYL-5-(TRIMETHOXY SILYL PROPYLTHIO) NORBORNANE-2,3-DICARBOXYLIC ANHYDRIDE

[75] Inventors: John L. Speier; Gary E. LeGrow, both of Midland, Mich.

[73] Assignee: Dow Corning Corporation, Midland, Mich.

[ * ] Notice: The portion of the term of this patent subsequent to June 14, 1988, has been disclaimed.

[22] Filed: Dec. 10, 1973

[21] Appl. No.: 423,322

Related U.S. Application Data

[63] Continuation-in-part of Ser. No. 66,134, Aug. 21, 1970, abandoned.

[52] U.S. Cl. ............................ 260/346.3; 117/135.1
[51] Int. Cl.² ....................................... C07D 307/89
[58] Field of Search .................. 260/346.3, 448.2 B

[56] References Cited
UNITED STATES PATENTS 3,627,806  12/1971  LeGrow ...................... 260/448.2 B Primary Examiner—Henry R. Jiles
Assistant Examiner—Bernard I. Dentz
Attorney, Agent, or Firm—Robert F. Fleming, Jr.

[57] ABSTRACT

Organosilicon carboxylic acid anhydrides are prepared by reacting mercaptosilanes or siloxanes with unsaturated carboxylic acid anhydrides in the presence of free radical generators. For example, gamma-mercaptopropyl trimethoxysilane is added to nadic methyl anhydride under the influence of azo-bis-isobutyronitrile to give

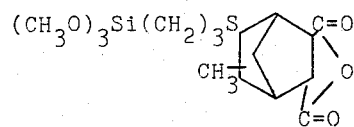

1 Claim, No Drawings

METHYL-5-(TRIMETHOXY SILYL PROPYLTHIO) NORBORNANE-2,3-DICARBOXYLIC ANHYDRIDE

This application is a continuation-in-part of our application Ser. No. 66,134 filed Aug. 21, 1970 and now abandoned.

The anhydride of this invention is useful as an adhesion promoter for silicone rubber which is cured by means of alkoxysilane crosslinkers. The material of this invention is also useful as an intermediate in the preparation of silicone-alkyd resins, which in turn, are useful as protective coatings and paints.

This invention relates to a carboxylic anhydride of formula

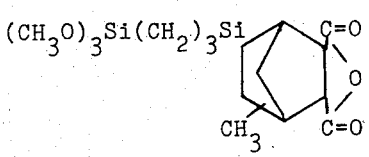

EXAMPLE

A solution of 98 g. of 3-mercaptopropyltrimethoxysilane and 89 g. of nadic methyl anhydride containing 0.05 g. of azo-bis-isobutyronitrile was irradiated with light of 2,537 angs. wave length for 1 hour. The product had a refractive index of 1.4910 and the structure was shown by nuclear magnetic resonance to be a silane of the formula

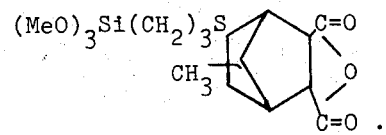

The silane was used to promote adhesion in silicone rubber as shown below.

100 parts of a hydroxyl endblocked polydimethylsiloxane,
25 parts of a silica filler,
3 parts ethylorthosilicate,
1 part silane
1 part dibutyl-tin-dilaurate were mixed and allowed to cure against an aluminum panel. The peel strength was 13.2 pounds per inch. The same formulation without the silane has a peel strength of about 0.15 pounds per inch.

That which is claimed is:
1. A compound of the formula

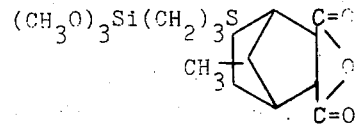

* * * * *